(12) United States Patent
Willis

(10) Patent No.: US 8,988,676 B2
(45) Date of Patent: Mar. 24, 2015

(54) WIDE VIEW LIGHT REFLECTOR

(71) Applicant: Larry A. Willis, Casselberry, FL (US)

(72) Inventor: Larry A. Willis, Casselberry, FL (US)

(73) Assignee: Larry A. Willis, Casselberry, FL (US)

( * ) Notice: Subject to any disclaimer, the term of this patent is extended or adjusted under 35 U.S.C. 154(b) by 34 days.

(21) Appl. No.: 13/917,003

(22) Filed: Jun. 13, 2013

(65) Prior Publication Data

US 2014/0368940 A1 Dec. 18, 2014

(51) Int. Cl.
*G01N 21/00* (2006.01)
*G02B 23/24* (2006.01)
*H04N 5/225* (2006.01)

(52) U.S. Cl.
CPC .... *G02B 23/2476* (2013.01); *H04N 2005/2255* (2013.01)
USPC .................................... 356/241.2; 356/241.5

(58) Field of Classification Search
CPC ............................................ H04N 2005/2255
USPC .......... 356/241.1, 241.2, 241.3, 241.4, 241.5, 356/241.6
See application file for complete search history.

(56) References Cited

U.S. PATENT DOCUMENTS

| | | | |
|---|---|---|---|
| 3,915,575 A | 10/1975 | Sick | |
| 4,583,852 A | 4/1986 | Cassidy | |
| 4,727,859 A * | 3/1988 | Lia | 356/241.5 |
| 4,732,472 A | 3/1988 | Konig | |
| 5,253,638 A * | 10/1993 | Tamburrino et al. | 600/170 |
| 5,936,723 A | 8/1999 | Schmidt | |
| 7,535,564 B2 * | 5/2009 | Di Fabrizio et al. | 356/241.1 |
| 8,587,647 B2 * | 11/2013 | Schober et al. | 348/82 |
| 2008/0026647 A1 * | 1/2008 | Boehnlein et al. | 439/882 |
| 2011/0090331 A1 * | 4/2011 | Draper | 348/82 |

OTHER PUBLICATIONS

NTEElectronics, Still images from ECG Wireless Inspection Camera WIC-1 demonstration video, http://www.youtube.com/watch?v=lqMbFdhoHNw#t=30, Sep. 2009.*
All-Spec, Online production brochure of WIC-1 with WIC-2 tip set, publicly available no later than—Dec. 30, 2011.*

* cited by examiner

*Primary Examiner* — Charlie Y Peng

(57) ABSTRACT

This apparatus provides a method to enable a borescope to see inside a bore with a brighter image and a less obstructed view. This removable apparatus is essentially an extended coil spring that grips over the forward end of a borescope shaft by compression. The opposite end of this apparatus is connected in the same manner to an opposing light reflector by constricting over the outside surface of a light reflector. As a borescope enters the bore, it emits light forward that is reflected by the light reflector rearward against the viewing surface inside the bore. This apparatus connects the borescope to an opposing reflective surface with an extended thin wire that is partially in view of the borescope, providing minimal obstruction of the viewing area that is seen by the borescope. This apparatus also provides a minimal increase to the outside diameter of the borescope allowing it to fit inside a smaller bore.

4 Claims, 2 Drawing Sheets

WIDE VIEW LIGHT REFLECTOR

BACKGROUND OF INVENTION

1. Field of the Invention

This invention relates in general to an apparatus that provides a method for assisting a borescope to view inside a bore. This includes a light reflector and a means of attaching to a borescope. It is also suitable for providing a brighter and less obstructed view inside a bore.

2. Discussion of the Related Art

There are several different uses for this device. One example is where hunters and shooters need to examine inside the barrel of their firearm for defects and to see if it is sufficiently clean. Visual inspection is required during the cleaning process to ensure maximum accuracy. One long existing problem is getting a clear view deep inside the barrel. One of the most important advantages of this device is to view inside a bore by providing a brighter and a less obstructed view. This method of attaching a reflective surface with a thin extended compression spring makes it possible to fit inside a smaller diameter bore to see a brighter and less obstructed view of the interior surface of the bore.

SUMMARY OF INVENTION

This removable apparatus provides a method for connecting a light reflector to a borescope for reflecting light against the viewing surface of the bore. This apparatus adds minimal outside diameter of the borescope thereby allowing the borescope and light reflector to fit inside the smallest bore possible. The center of this apparatus is a straight, long, thin, integral wire that connects a light reflector to the borescope while provides a minimal obstruction of view inside the bore. This apparatus attaches a borescope to a light reflector using spring compression to allow adjustable in-line positioning of different type reflectors.

DETAILED DESCRIPTION OF THE PREFERRED EMBODIMENTS

Figure 1:
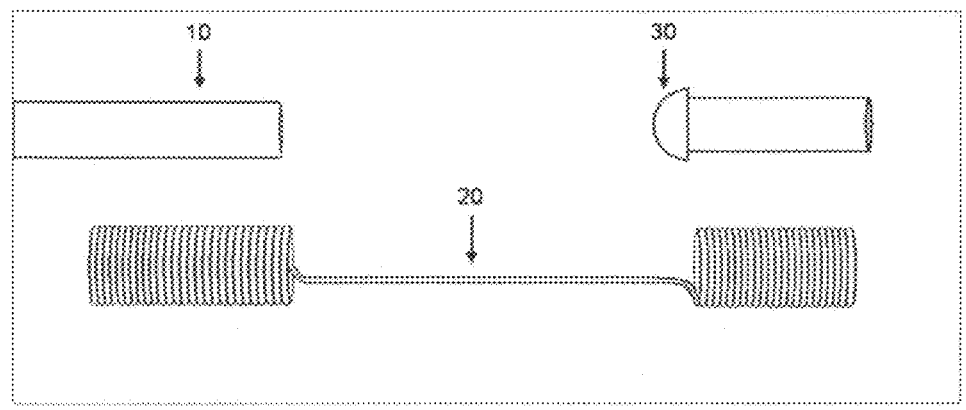
FIG. 1 is a view showing a borescope, a extended compression spring, and a light reflector.
Figure 2:
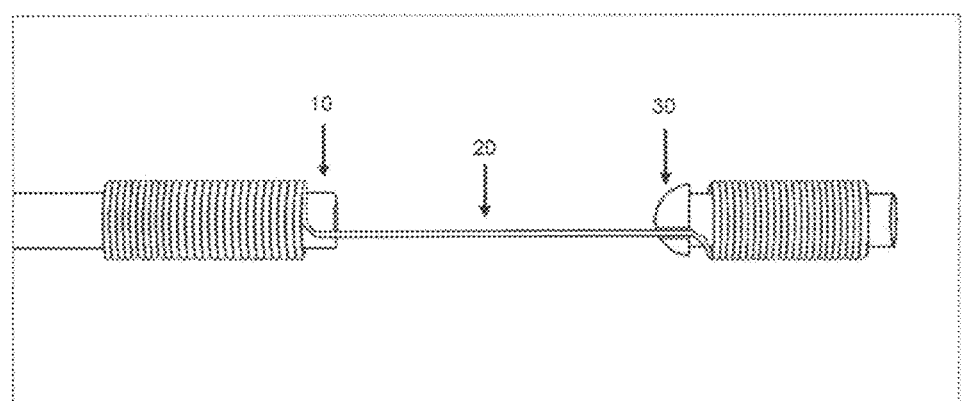
FIG. 2 is a view showing a light reflector connected to a borescope by an extended compression spring.
Figure 3:
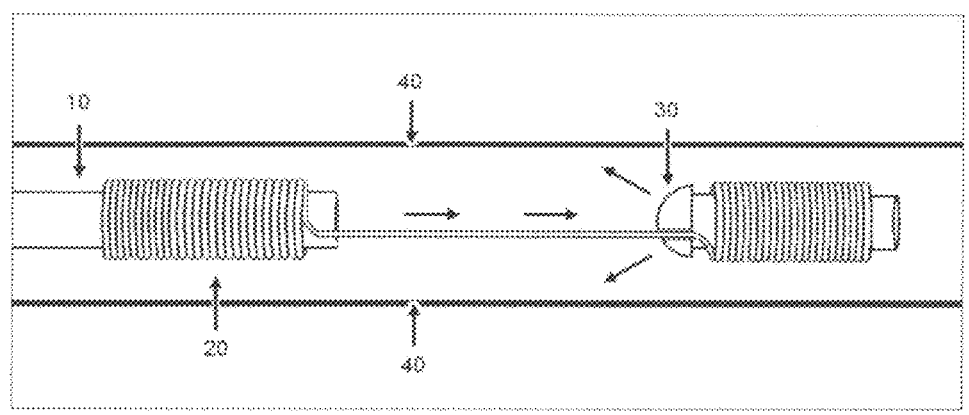
FIG. 3 is a view showing a borescope emitting light toward the reflector and reflecting rearward to illuminate the inside surface of a bore.

Referring now to the drawings, which are for the purpose of illustrating the preferred embodiment of the invention and not for the purpose of limiting the same, the drawing FIG. 1 shows an enlarged view of a borescope and individual parts of the complete Wide View Light Reflector. This includes the extended compression spring 20 and the light reflector 30. FIG. 2 shows an enlarged view of the light reflector 30 that is connected to a borescope 10 by an extended compression spring 20. The borescope 10 is pushed inside the compression spring 20 until it is securely gripped and positioned in an opposing alignment with the light reflector 30. The Light Reflector 30 is pushed into the opposite end of the compression spring 20 until it is securely gripped and positioned in opposing alignment with the borescope 10. For clarification in describing the purpose and function of the Wide View Light Reflector FIG. 3 shows light being emitted from a borescope 10 to the surface of the light reflector 30 and reflected back toward the viewable inside surface of the bore 40. The light reflector 30 is secured in place by the compression of the extended compression spring 20 and can be adjusted front to rear providing the optimal position for reflecting light back to the bore surface 40 thereby illuminating the view of the borescope 10.

What is claimed is:

1. An apparatus for providing a borescope with a wider, brighter and less obstructed view, comprising:
   a removable coil spring capable of connecting said borescope suitable to facilitate viewing inside a visible interior of a bore to an opposing light reflector by means of a compression spring gripping both objects and positioned to reflect light inside said bore by providing a minimal visible connection using an extended thin wire thereby providing less obstruction to the viewing surface;
   wherein the opposing light reflector is rivet-shaped and comprises a dome section and a stem section;
   and wherein said compression spring grips the stem section thereby positioning the dome section to reflect and illuminate the visible interior of the bore.

2. The apparatus of claim 1, for attaching said borescope to said opposing light reflector by said thin compression spring, wherein the apparatus adds minimal outside diameter to said borescope and allows said borescope and said light reflector to therefore fit inside said bore with a smaller inside diameter.

3. The apparatus of claim 1, for attaching said borescope to the opposing light reflector, wherein the apparatus allows positioning of the opposing light reflector at various distances from said borescope.

4. The apparatus of claim 1, for attaching said borescope to different types of light reflecting surfaces.

* * * * *